United States Patent
Sauter et al.

(10) Patent No.: US 11,101,471 B2
(45) Date of Patent: Aug. 24, 2021

(54) METHOD FOR PRODUCING A FLOW PLATE FOR A FUEL CELL AND/OR AN ELECTROLYZER

(71) Applicant: Robert Bosch GmbH, Stuttgart (DE)

(72) Inventors: Ulrich Sauter, Karlsruhe (DE); Jan Hendrik Ohs, Renningen (DE); Stefan Schoenbauer, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 16/474,379

(22) PCT Filed: Dec. 19, 2017

(86) PCT No.: PCT/EP2017/083580
§ 371 (c)(1),
(2) Date: Jun. 27, 2019

(87) PCT Pub. No.: WO2018/122045
PCT Pub. Date: Jul. 5, 2018

(65) Prior Publication Data
US 2019/0348685 A1    Nov. 14, 2019

(30) Foreign Application Priority Data

Dec. 27, 2016 (DE) .................. 10 2016 226 234.3

(51) Int. Cl.
*H01M 8/02* (2016.01)
*C25B 9/00* (2021.01)
(Continued)

(52) U.S. Cl.
CPC ............... *H01M 8/026* (2013.01); *C25B 9/00* (2013.01); *C25B 15/08* (2013.01);
(Continued)

(58) Field of Classification Search
None
See application file for complete search history.

(56) References Cited

U.S. PATENT DOCUMENTS 3,575,027 A * 4/1971 Eisler ............... H05B 3/26
72/186
4,729,871 A 3/1988 Morimoto
(Continued)

FOREIGN PATENT DOCUMENTS

DE      10163631       7/2003
DE      112011103324   8/2013
(Continued)

OTHER PUBLICATIONS

International Search Report for Application No. PCT/EP2017/083580 dated Feb. 22, 2018 (English Translation, 4 pages).

*Primary Examiner* — Jonathan Crepeau
*Assistant Examiner* — Angela J Martin
(74) *Attorney, Agent, or Firm* — Michael Best & Friedrich LLP (57) ABSTRACT

The invention relates to a method for producing a flow plate (10a; 10b) for a fuel cell, in particular a PEM fuel cell, and/or an electrolyzer, wherein the flow plate (10a; 10b) is provided with at least one flow element (12a; 12b), which is at least partially made of metal fibers (14a; 14b). According to the invention, in at least one method step, the metal fibers (14a; 14b) are aligned by means of at least one alignment unit (30a; 30b).

18 Claims, 4 Drawing Sheets

(51) Int. Cl.
*C25B 15/08* (2006.01)
*H01M 8/026* (2016.01)
*H01M 8/0232* (2016.01)
*H01M 8/0245* (2016.01)
*H01M 8/0247* (2016.01)
*H01M 8/1018* (2016.01)

(52) U.S. Cl.
CPC ....... *H01M 8/0232* (2013.01); *H01M 8/0245* (2013.01); *H01M 8/0247* (2013.01); *H01M 2008/1095* (2013.01)

(56) References Cited

U.S. PATENT DOCUMENTS

2004/0265677 A1* 12/2004 Losfeld ............... H01M 8/0241
429/444
2005/0184421 A1* 8/2005 de Nagybaczon ........ B32B 5/02
264/68

FOREIGN PATENT DOCUMENTS

| EP | 147912 | 7/1985 | |
|---|---|---|---|
| EP | 1328030 | 7/2003 | |
| EP | 1328030 A1 * | 7/2003 | .............. H01M 8/02 |
| JP | 2007141743 | 6/2007 | |
| JP | 2007141743 A | 6/2007 | |
| JP | 2007280870 A | 10/2007 | |

* cited by examiner

METHOD FOR PRODUCING A FLOW PLATE FOR A FUEL CELL AND/OR AN ELECTROLYZER

BACKGROUND OF THE INVENTION

A flow plate for fuel cells is already known, which comprises a flow plate with at least one flow element, wherein the flow element has a foam structure. In addition, it is known to sinter the flow element with a substrate.

The invention relates to a method for producing a flow plate for a fuel cell, in particular a PEM fuel cell, and/or an electrolyzer, wherein the flow plate comprises at least one flow element, which consists at least partially of metal fibers.

It is suggested that in at least one method step the metal fibers are aligned by means of at least one alignment unit.

A "fuel cell" should be understood in particular as meaning a unit, which is provided to convert at least one chemical reaction energy of at least one, in particular continuously supplied, combustion gas, in particular hydrogen and/or carbon monoxide, and at least one oxidizing agent, in particular oxygen, in particular into electrical energy. An "electrolyzer" should be understood in particular as meaning a unit which is provided to perform electrolysis, wherein in particular electrodes at which gases are formed, preferably hydrogen and oxygen, are separated by a membrane. "Provided" should in particular be understood as meaning designed and/or fitted. The fact that an object is provided for a specific function should be understood in particular to mean that the object fulfils and/or executes this specific function in at least one application and/or operating state.

A "flow plate" should be understood in particular as meaning a mechanical unit, which is provided for an in particular electrical contacting of at least one fuel cell and/or of at least two in particular adjacent fuel cells and/or for a supply of a fuel cell with a combustion gas, in particular hydrogen and/or oxygen and/or for a removal of at least one reaction product, in particular water and/or water vapor. In particular, the flow plate can be configured as a monopolar plate, as a bipolar plate and/or as an end plate and/or as a gas diffusion installation. The flow element is in particular provided for a supply of a fuel cell with a combustion gas, in particular hydrogen and/or oxygen and/or for a removal of at least one reaction product, in particular water and/or water vapor. In particular, the flow element comprises at least one and preferably a plurality of flow channels. A "flow channel" should be understood in particular as meaning a channel, which is provided at least partially for a guidance of a flow, in particular an inflow and/or an outflow of a combustion gas, in particular hydrogen and/or carbon monoxide and/or at least one oxidizing agent, in particular oxygen, and which encloses a flow when viewed in the flow direction directly, at least partially, preferably on three sides and particularly advantageously completely.

A "metal fiber" should be understood in particular as meaning a metal element, whose longitudinal extension is at least 10 times, in particular at least 20 times, and preferably at least 50 times greater than a transverse extension of the element perpendicular to the longitudinal extension. Preferably the metal fibers in an application in fuel cells consist of a stainless steel, advantageously of 316L, wherein in an application in electrolyzers the metal fibers advantageously consist of titanium and/or a titanium alloy. "Align" should be understood in particular as meaning an active process, wherein the metal fibers are preferably intentionally placed. In particular, the method can be demonstrated by means of optical microscopy on the product.

By this means, a generic method with improved properties with regard to a production of a flow plate for fuel cells and/or electrolyzers can be provided. In particular, flexibility can advantageously be improved. In particular, a flow plate, in particular for use as a bipolar plate and/or in a gas diffusion plant can advantageously be produced, wherein at the same time contact resistances and/or flow resistances can advantageously be minimized. Furthermore, a smooth surface can advantageously be produced by means of the alignment unit, whereby a flow resistance can advantageously be reduced. In particular, a porosity of the flow plate can advantageously be increased.

In a preferred embodiment of the method, it is proposed that in the method step the metal fibers are deposited on at least one substrate. A "substrate" should be understood in particular as meaning an element which in particular serves as carrier material. In particular, the substrate can form a base body of the flow plate, wherein alternatively it is also conceivable that the metal fibers are detached from the substrate during manufacture of the flow plate in order to be subsequently connected to a base body of the flow plate. The substrate is in particular formed from a thin metal sheet and/or a thin film, which preferably consists of the same metal material as the metal fibers. Advantageously in at least one method step, the substrate is fed to a coating section by means of at least one feed roller. A "coating section" should be understood in particular as meaning a region in which the metal fibers are deposited on the substrate. A "feed roller" should be understood in particular as meaning a roller, which is provided to feed the substrate to the coating section. In particular, at least in the method step the metal fibers are in an at least partially softened state. The fact that the metal fibers are deposited on the substrate should in particular be understood as meaning a centrifuging and/or spraying and/or dripping of the metal fibers onto the substrate, wherein advantageously a structure is formed. By this means mechanical stability can advantageously be improved.

It is furthermore proposed that the metal fibers are deposited on the substrate in a directional manner. By this it should be understood in particular that the metal fibers form a directional structure on the substrate. A "directional structure" should be understood in particular as meaning a structure, which has an identifiable regularity and/or arrangement of metal fibers on the substrate. Advantageously the metal fibers are layered on one another at a flat angle. Preferably the metal fibers in the same plane have a defined spacing in the longitudinal direction. In particular, the metal fibers at least partially form the flow channels, which in particular at least in sections run at least substantially parallel and/or alternately to one another. By this means advantageously a flow resistance can be reduced.

In a further embodiment it is proposed that the metal fibers are connected to the substrate. By this it should be understood in particular that the substrate is connected to the metal fibers in a firmly bonded manner. "Connected in a firmly bonded manner" should be understood in particular to mean that the mass parts are held together by atomic or molecular forces, in which case in particular a contact is made which is the same as a welding contact and/or a local sinter contact. Preferably the contact is formed when the softened metal fibers impinge upon the substrate. By means of the configuration according to the invention, a contact resistance can advantageously be achieved between the parts connected in a firmly bonded manner.

Furthermore, mechanical stability can advantageously be improved.

It is further proposed that the metal fibers are deposited in the method step in particular onto the substrate via a roller of the alignment unit which rotates at least temporarily and preferably permanently and/or oscillates in the axial direction. An "axial direction" should be understood in particular as meaning a direction which is at least substantially parallel to an axis of rotation of the roller. "Substantially parallel" should be understood here in particular as meaning an alignment of a direction relative to a reference direction, in particular in a plane, wherein the direction with respect to the reference direction has a deviation in particular of less than 8°, advantageously less than 5°, and particularly advantageously less than 2°. In particular, the roller determines the properties of the metal fibers. Preferably an orientation of the metal fibers in the longitudinal direction of the substrate is provided by means of the direction of rotation of the roller. In this case, "longitudinal direction" should be understood in particular as meaning a direction parallel to the feed direction of the substrate. Advantageously the metal structure is constructed by means of the axial rotation, wherein in particular the three-dimensional network of metal fibers is formed. Preferably a length of the metal fibers is determined by means of the diameter of the roller and/or its rotation frequency. Advantageously the metal fibers have a fiber length of in particular at least 10 cm, preferably of at least 5 cm, advantageously of at least 2 cm, and particularly advantageously of at least 1 cm. In particular, the alignment unit comprises a melt bath, which can advantageously be exposed to a gas pressure. In particular, the melt bath is provided to deposit molten metal onto the roller which rotates and/or oscillates in the axial direction. In a preferred embodiment, it is proposed that the melt bath has at least one nozzle element, wherein the nozzle element is provided to deposit molten metal fibers onto the roller. In this case, the metal fibers are optimized by means of the roller which rotates and/or oscillates in the axial direction. By this means, advantageously a directional structure can be produced. Furthermore, advantageously construction can be simplified.

In a further embodiment of the invention, it is proposed that the metal fibers are produced in the method step by the roller. In this case, by means of the melt bath a metal film is deposited in the longitudinal direction onto the roller which rotates and/or oscillates in the axial direction. In so doing, in at least one further method step, in particular by means of the properties of the roller, the metal fibers are provided, which metal fibers are deposited on the substrate. Whereby the properties of the metal fibers are merely determined by means of the roller which rotates and/or oscillates in the axial direction. By this means, advantageously a directional structure can be produced. Furthermore, advantageously construction can be further simplified.

In a particularly preferred embodiment of the invention, it is proposed that a diameter of the metal fibers is adjusted by means of at least one roller property, in particular a groove geometry of grooves and/or a wetting property of the roller. A "roller property" should be understood in particular as meaning a property of the roller, which at least partially influences the metal fibers. A "wetting property" should be understood in particular as meaning an adhesion capacity of at least one molecule to a fixed boundary surface. In particular, that of the diameter is additionally at least partially determined by a rotation and oscillation frequency. In particular, the surface of the roller is in this case preferably microstructured in a grooved manner, wherein the grooves preferably run along a circumference of the roller. "Grooved manner" should be understood in particular as meaning a recess and/or a projection. "Microstructured" should be understood in particular as meaning a groove structure, which is preferably in the micro range. In this case, preferably the metal fibers are formed, which preferably have a fiber diameter of in particular between 1 μm and 1000 μm, preferably between 5 μm and 750 μm, advantageously between 10 μm and 500 μm, particularly advantageously between 25 μm and 400 μm, and particularly preferably between 50 μm and 300 μm. By this means, advantageously construction can be advantageously simplified. Furthermore, determination of the diameter of at least one metal fiber can be further optimized.

It is proposed that a waviness of the metal fibers is adjusted during manufacture by means of a rotational speed of the roller and/or by means of a gas inflow to the metal fibers. A "waviness" should be understood in particular as meaning the ratio of the spacing between the highest and lowest point of the fiber to the diameter of the fiber. Preferably the gas inflow is contrary to the flight direction of the softened metal fibers and in particular between the roller and substrate. The theory of the aerodynamically driven wave formation of melt fibers is described, for example, in [Jens Eggers and Emmanuel Villermaux, 2008, Rep. Prog. Phys. 71 036601 doi:10.1088/0034-4885/71/3/036601]. By this means, advantageously a construction of a structure can advantageously be improved. In particular, a directional structure can be optimized.

Advantageously it is proposed that a plurality of layers of metal fibers are arranged one above the other. For this purpose in particular an alignment unit and preferably at least one further alignment unit is used. Advantageously when the metal fibers are layered one above the other, a plurality of layers of metal fibers are formed. Advantageously between 2 and 10 layers and particularly preferably between 2 and 5 layers are produced. Preferably the structure has a thickness of several 100 μm, in particular a maximum of 2000 μm, preferably at most 1000 μm, advantageously a maximum of 700 μm, and particularly advantageously at most 500 μm. In particular, a three-dimensional network of metal fibers is formed on the substrate. A "three-dimensional network" should be understood in particular to mean that the metal fibers contact one another and form a directional structure, wherein in particular a three-dimensional matrix is formed. By this means, a continuous electric contact perpendicular to the gas flow direction can advantageously be ensured through the three-dimensional network. Furthermore, advantageously a possibility for integrating flow distributor structure and current/gas distributor structure in a component can be implemented through gradients in the pore size distribution, in particular through a multilayer coating with simultaneous variation of the mean fiber diameter. Furthermore, at the same time contact resistances and flow resistances can be minimized.

In a further preferred embodiment of the invention, it is proposed that a structure consisting of the metal fibers is calendered in at least one method step. "Calendered" should be understood in particular as meaning a process which at least smooths an element and gives a defined overall thickness. Preferably rollers are used for this purpose. In particular, in the method step preferably the substrate which is coated with the metal fibers is fed to at least two counter-rotating rollers. In particular, the rollers are stiffly mounted. Advantageously the structure consisting of metal fibers, is given a defined overall thickness and porosity by means of the rollers. Preferably the spacing between the rollers determines a final thickness of the structure. Advantageously upwardly projecting metal fibers are snapped off by means of the rollers. In particular, the structure produced has a porosity of in particular at least 60%, preferably at least 70%, advantageously of at least 80%, particularly advantageously of at least 85% and particularly preferably of at least 90%. By this means, an overall thickness and/or a porosity can be advantageously determined in a simple manner. Furthermore advantageously a flattest possible surface can be provided.

In at least one further exemplary embodiment it is proposed that at least one further substrate is fed for coating. Preferably the further substrate is fed to the structure of metal fibers, which is already connected to the first substrate. In particular, the further substrate is connected to the still at least partially softened metal fibers. By this means the structure can advantageously be connected to the further substrate in a firmly bonded manner. Furthermore, advantageously at the same time a flow distributor structure for reaction gases and on the rear side a flow distributor structure for cooling water can be provided. Furthermore, advantageously in the multilayer flow plate thus produced particularly low electric transition resistance can be achieved.

In an alternative embodiment it is feasible that the further substrate in at least one further method step is coated by means of a further alignment unit. In at least one further method step preferably the coated further substrate is fed to the coated first substrate. By this means in particular efficiency can be increased.

In a further alternative embodiment it is proposed that at least one substrate is used, which substrate has at least one detachable surface. By this it should be understood in particular that the structure is advantageously detachable from the substrate after the calendering. By this means advantageously a free-standing gas diffusion plant can be provided.

In addition, an apparatus for carrying out a method is proposed, which comprises the alignment unit. Preferably the apparatus comprises an alignment unit, which preferably comprises a roller which rotates and/or oscillates in the axial direction and a melt bath. The alignment unit is in particular provided to produce the metal fibers and/or to determine the properties of the metal fibers. Furthermore the apparatus advantageously comprises a feed roller, which in particular is at least provided to feed the substrate to the coating section. Furthermore the apparatus advantageously comprises a calender, which in particular is at least provided to calender the structure and the at least one substrate.

The method, the apparatus and/or the flow plate should hereby not be restricted to the above-described application and embodiment. In particular, the method, the apparatus, and/or the flow plate can have a number of individual elements, components, and units differing from a number mentioned herein for fulfilment of an operating mode described herein.

BRIEF DESCRIPTION OF THE DRAWINGS

Further advantages are obtained from the following description of the drawings. Two exemplary embodiments of the invention are shown in the drawings. The drawings, the description, and the claims contain numerous features in combination. The person skilled in the art will expediently also consider the features individually and combine them into meaningful further combinations.

In the figures.

DETAILED DESCRIPTION

Figure 1:
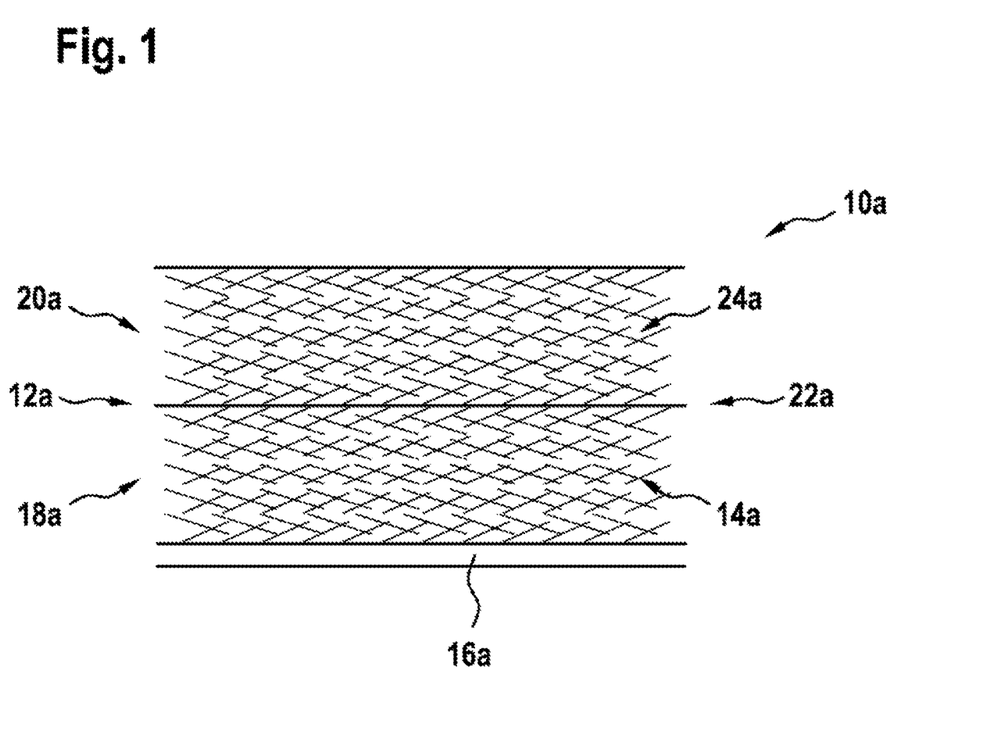
FIG. 1 shows a part of a flow plate in a schematic sectional view.

FIG. 1 shows a schematic sectional view of a part of a flow plate 10a. The flow plate 10a comprises a flow element 12a and a substrate 16a. In an alternative embodiment it is conceivable that the flow plate 10a merely comprises the flow element 12a.

The substrate 16a is formed from a metal sheet and/or a film. The substrate 16a serves as carrier material. The substrate 16a forms a base body of the flow plate 10a. The substrate 16a is used for mechanical stability.

The flow element 12a comprises metal fibers 14a. The metal fibers 14a are shown highly schematically for the sake of clarity. The metal fibers 14a are connected in a firmly bonded manner to the substrate 16a. The metal fibers 14a form at least substantially at least one flow channel 24a. The flow channels 24a run at least in sections at least substantially parallel and/or alternately to one another. The metal fibers 14a are arranged in a directional manner on the substrate 16a. The metal fibers 14a form a directional structure 22a. The structure 22a has an identifiable regularity and/or arrangement of metal fibers 14a on the substrate 16a. The metal fibers 14a are layered on one another at an angle which is less than 5°. The metal fibers 14a when viewed in the same plane have a defined spacing in the longitudinal direction.

The flow element 12a has a plurality of layers 18a, 20a. The layers 18a, 20a comprise a three-dimensional network of metal fibers 14a. The metal fibers 14a form a three-dimensional matrix. The metal fibers 14a contact one another. The contact is provided to ensure a continuous electrical contact perpendicular to the gas flow direction through the three-dimensional network.

Figure 2:
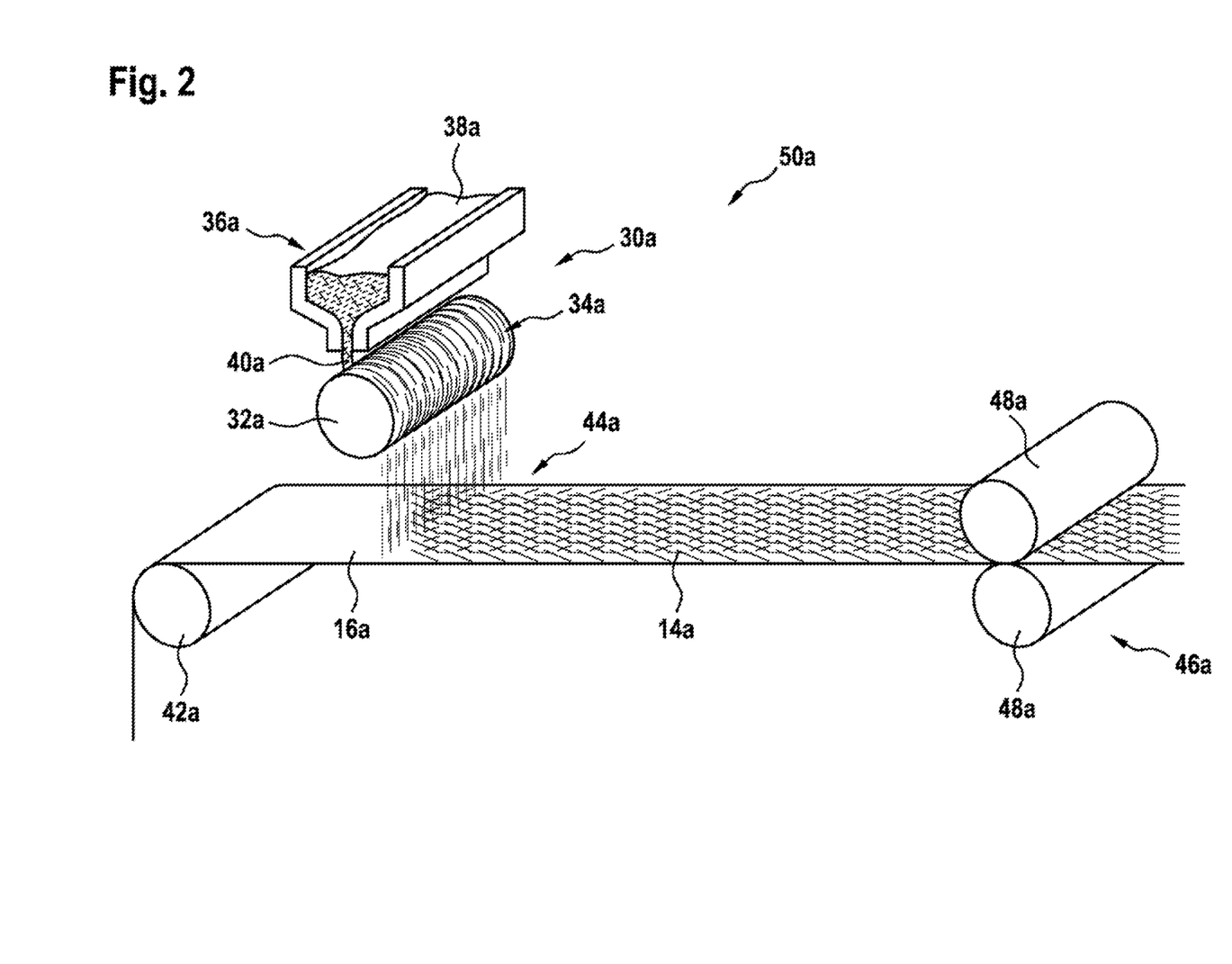
FIG. 2 shows an apparatus for producing the flow plate in a schematic view.

FIG. 2 shows an apparatus 50a for carrying out the method for producing the flow plate 10a for a fuel cell, in particular a PEM fuel cell and/or an electrolyzer.

The apparatus 50a comprises an alignment unit 30a. The alignment unit 30a comprises a melt bath 36a. The melt bath 36a can be exposed to a gas pressure. The melt bath 36a is provided to deposit liquid metal 38a onto the roller 32a. The melt bath 36a is provided to deposit a liquid metal film 40a in the longitudinal direction onto the roller 32a. The alignment unit 30a is provided to produce the metal fibers 14a. In at least one method step the metal fibers 14a are aligned by means of at least one alignment unit 30a. The metal fibers 14a are deposited in the method step via a roller 32a of the alignment unit 30a which rotates at least temporarily and/or oscillates in the axial direction. The alignment unit 30a is provided to determine the properties of the metal fibers 14a. The properties of the metal fibers 14a are determined by means of the roller 32a.

The metal fibers 14a are produced in the method step by the roller 32a. An orientation of the metal fibers 14a is provided by means of the direction of rotation of the roller 32a. The orientation is in the longitudinal direction of the substrate 16a. The metal structure 22a is built up by means of the axial rotation. A three-dimensional network of metal fibers 14a is thereby formed. A length of the metal fibers 14a is determined by means of the diameter of the roller 32a. A length of the metal fibers 14a is determined by means of a rotation frequency of the roller 32a. The metal fibers 14a have a fiber length of at least 1 cm.

A diameter of the metal fibers 14a is adjusted by means of at least one roller property, in particular a groove geometry of grooves 34a and/or a wetting property, of the roller 32a. The diameter of the metal fibers 14a is determined at least partially by a rotation and oscillation frequency of the roller 32a. The surface of the roller 32a is microstructured in a grooved manner. The grooves 34a run along a circumference of the roller 32a. The grooves 34a are configured as a recess and/or as a projection. The metal fibers 14a have a fiber diameter between 50 μm and 300 μm.

A waviness of the metal fibers 14a is adjusted by means of a rotational speed of the roller 32a and/or by means of a gas inflow of the metal fibers 14a during manufacture. The gas inflow is contrary to the flight direction of the softened metal fibers 14a. The gas inflow is provided between the roller 32a and substrate 16a.

In the method step the metal fibers 14a are deposited on at least one substrate 16a. The metal fibers 14a are in an at least partially softened state. The metal fibers 14a are connected to the substrate 16a. The metal fibers 14a are connected to the substrate 16a in a firmly bonded manner. The connection is produced when the softened metal fibers 14a impinge upon the substrate 16a. The metal fibers 14a are deposited on the substrate 16a in a directional manner. The metal fibers 14a form the directional structure 22a.

Alternatively the apparatus 50a has at least one further alignment unit 30a. In this case, a plurality of layers 18a, 20a of metal fibers 14a are arranged one above the other. A three-dimensional network of metal fibers 14a is formed on the substrate 16a.

The apparatus 50a comprises a feed roller 42a. The feed roller 42a is at least provided to feed the substrate 16a to a coating section 44a.

The apparatus 50a comprises a calender 46a. The calender 46a is at least provided to smooth an element and to give a defined overall thickness. The calender 46a has at least one roller 48a. A structure 22a consisting of the metal fibers 14a is calendered in at least one method step. In the method step, the structure 22a consisting of metal fibers 14a is fed to two counter-rotating rollers 48a. The rollers 48a are mounted stiffly. The structure 22a is given a defined overall thickness and porosity by means of the rollers 48a. The spacing between the rollers 48a determines a final thickness of the structure 22a. Upwardly projecting metal fibers 14a are snapped off by means of the rollers 48a. The structure 22a produced has a porosity of at least 90%.

Figure 3:
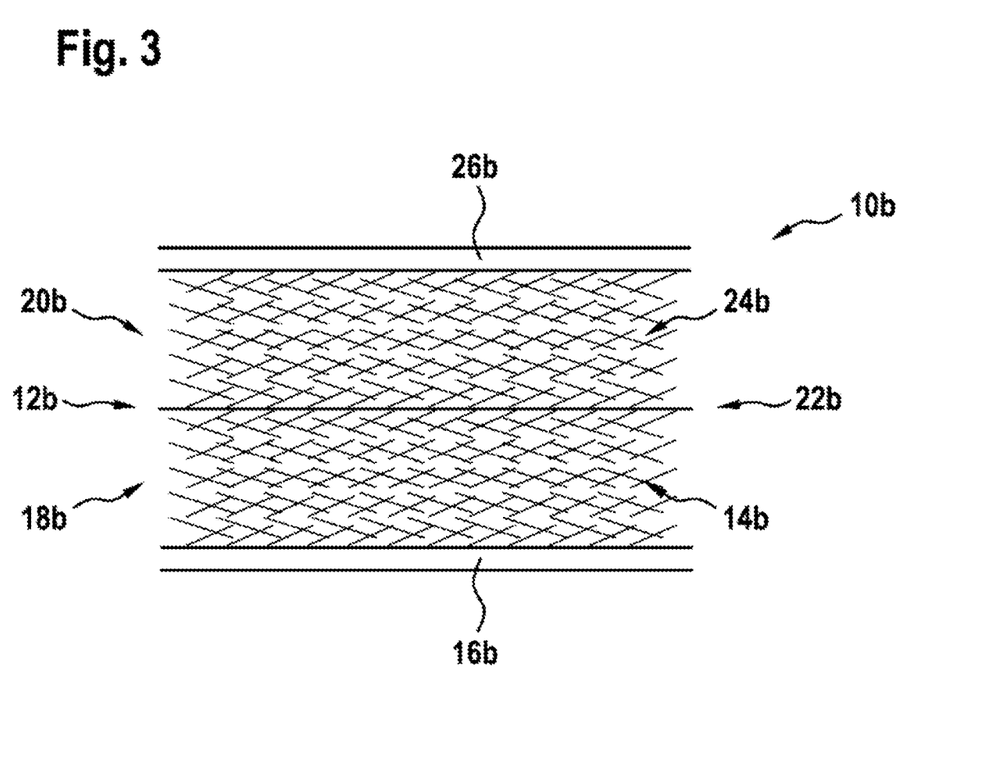
FIG. 3 shows a part of a further flow plate in a schematic sectional view.
Figure 4:
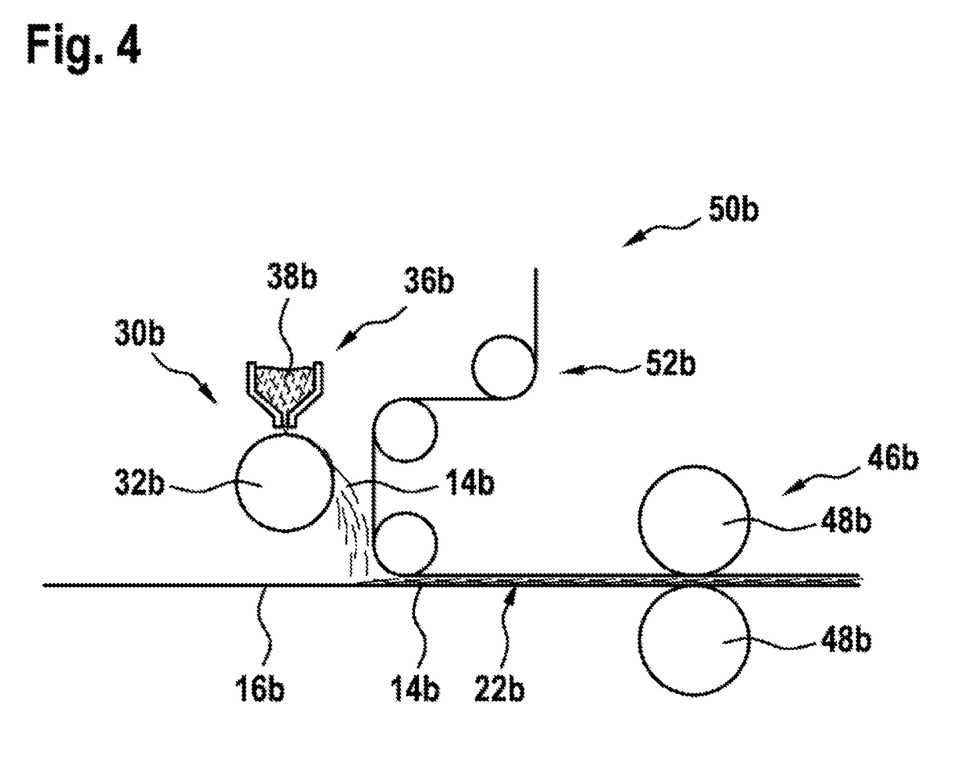
FIG. 4 shows an apparatus for producing the further flow plate in a schematic view.

FIGS. 3 and 4 show a further exemplary embodiment of the invention. The following descriptions and the drawing are substantially restricted to the differences between the exemplary embodiment, wherein in relation to identically designated components, in particular in relation to components having the same reference numbers, reference can fundamentally be made to the drawings and/or the description of the other exemplary embodiments, in particular FIGS. 1 and 2. In order to distinguish the exemplary embodiments, the letter a is placed after the reference numbers of the exemplary embodiment in FIGS. 1 and 2. In the exemplary embodiment of FIGS. 3 and 4, the letter a is replaced by the letter b.

FIG. 3 shows a schematic sectional view of a part of an alternative flow plate 10b. The flow plate 10b comprises a flow element 12b, a substrate 16b, and at least one further substrate 26b. The further substrate 26b is of the same material as the first substrate 16b. By this means, at the same time a flow distributor structure for reaction gases and on the rear side and a flow distributor structure for cooling water are provided.

FIG. 4 shows an apparatus 50b for carrying out the method for producing the alternative flow plate 10b. The apparatus 50b has at least one roller system 52b. The further substrate 26b is fed in at least one method step to the coating of the structure 22b. The structure 22b is already connected to the first substrate 16b. The further substrate 26b is connected to the still at least partially softened metal fibers 14b in a firmly bonded manner. By this means lower electrical transition resistance can be achieved.

What is claimed is:

1. A method for producing a flow plate (10a; 10b) for a fuel cell, wherein the flow plate (10a; 10b) comprises at least one flow element (12a; 12b), which comprises metal fibers (14a; 14b), the method comprising:
    (a) aligning the metal fibers (14a; 14b) using at least one alignment unit (30a; 30b) having a roller (32a, 32b), and
    (b) using the roller (32a, 32b) to deposit the aligned metal fibers (14a; 14b) on at least one substrate (16a; 16b), wherein the roller (32a, 32b) rotates at least temporarily and/or oscillates in the axial direction.

2. The method as claimed in claim 1, characterized in that the metal fibers (14a; 14b) are deposited on the substrate (16a; 16b) in a directional manner.

3. The method as claimed in claim 1, characterized in that the metal fibers (14a; 14b) are connected to the substrate (16a; 16b).

4. The method as claimed in claim 1, characterized in that the metal fibers (14a; 14b) are produced by the roller (32a; 32b).

5. The method as claimed in claim 1, characterized in that a diameter of the metal fibers (14a; 14b) is adjusted by at least one roller property of the roller (32a; 32b).

6. The method as claimed in claim 1, characterized in that a waviness of the metal fibers (14a; 14b) is adjusted during manufacture by a rotational speed of the roller (32a; 32b) and/or by a gas inflow to the metal fibers (14a; 14b).

7. The method as claimed in claim 1, characterized in that a plurality of layers (18a; 20a; 18b; 20b) of metal fibers (14a; 14b) are arranged one above an other.

8. The method as claimed in claim 1, characterized in that a structure (22a; 22b) consisting of the metal fibers (14a; 14b) is calendered in at least one method step.

9. The method as claimed in claim 1, wherein the flow plate (10a; 10b) is configured for use in a PEM fuel cell and/or an electrolyzer.

10. The method as claimed in claim 5, wherein the at least one roller property includes a groove geometry of grooves (34a; 34b) of the roller (32a; 32b).

11. The method as claimed in claim 10, wherein the at least one roller property also includes a wetting property of the roller (32a; 32b).

12. The method as claimed in claim 5, wherein the at least one roller property includes a wetting property of the roller (32a; 32b).

13. The method as claimed in claim 1, characterized in that the roller (32a; 32b) rotates at least temporarily.

14. The method as claimed in claim 1, characterized in that the roller (32a; 32b) oscillates in the axial direction.

15. The method as claimed in claim 1, characterized in that the roller (32a; 32b) rotates at least temporarily and oscillates in the axial direction.

16. The method as claimed in claim 1, characterized in that each metal fiber of the aligned metal fibers (14a; 14b)

includes a longitudinal centerline that deviates less than 8° from a reference direction, wherein the reference direction extends perpendicularly away from a longitudinal centerline of the roller (32*a*; 32*b*).

17. The method as claimed in claim 1, characterized in that each metal fiber of the aligned metal fibers (14*a*; 14*b*) includes a longitudinal centerline that deviates less than 5° from a reference direction, wherein the reference direction extends perpendicularly away from a longitudinal centerline of the roller (32*a*; 32*b*).

18. The method as claimed in claim 1, characterized in that each metal fiber of the aligned metal fibers (14*a*; 14*b*) includes a longitudinal centerline that deviates less than 2° from a reference direction, wherein the reference direction extends perpendicularly away from a longitudinal centerline of the roller (32*a*; 32*b*).

\* \* \* \* \*